_United States Patent_ [19]

Pisecky et al.

[11] 3,773,519

[45] Nov. 20, 1973

[54] PROCESS FOR TREATING A POWDERED FAT-CONTAINING MILK PRODUCT

[75] Inventors: Jan Pisecky; Vagn Westergaard, both of Tastrup, Denmark

[73] Assignee: Aktieselskabet Niro Atomizer, Soborg, Denmark

[22] Filed: Sept. 22, 1971

[21] Appl. No.: 182,799

[30] Foreign Application Priority Data
Sept. 25, 1970 Denmark .................................. 4920

[52] U.S. Cl.................... 426/99, 426/187, 426/189, 426/216, 426/358, 426/302, 426/456
[51] Int. Cl......................... A23c 11/00, A23c 9/00
[58] Field of Search............................ 99/63, 56, 54

[56] References Cited
UNITED STATES PATENTS
3,164,473  1/1965  Shields et al............................ 99/56
3,120,438  2/1964  McIntre et al......................... 99/203

FOREIGN PATENTS OR APPLICATIONS
463,394  2/1950  Canada................................... 99/56

_Primary Examiner_—S. Leon Bashore
_Assistant Examiner_—Kenneth M. Schor
_Attorney_—Richard C. Sughrue et al.

[57] ABSTRACT

The reconstitution properties in cold water are improved of a powdered fat-containing milk product, especially whole milk powder, by applying a coating of lecithin, possibly dissolved in a fat. The quantity of lecithin and the quantity as well as the melting characteristic of the possible fat which is applied, are proportioned in dependence of the quantity and the melting characteristic of free surface fat present on the milk product prior to the treatment, as well as in dependence of the specific surface of the milk product. Hereby the quantity of lecithin and possible added fat plus the free surface fat present prior to the treatment is kept within specified limits, and the ratio between lecithin and that part of the free surface fat present before the treatment which is liquid at ambient temperature plus that part of the possibly applied fat which is liquid at ambient temperature is also kept within specified limits, and further a specified minimum thickness is obtained of the liquid fraction present on the surface of the product after the treatment. The treated product has excellent reconstitution properties in cold water.

4 Claims, 3 Drawing Figures

PROCESS FOR TREATING A POWDERED FAT-CONTAINING MILK PRODUCT

The present invention relates to a process for treating a powdered fat-containing milk product in order to enhance its reconstitution properties (more particularly wettability and dispersibility) in cold water, in which a coating of lecithin, possibly dissolved in a fat, is applied to powder agglomerates having a particle size of more than 100 $\mu$.

Fat-containing powdered milk products, such as whole milk powder, powdered compositions for the production of ice cream, powdered compositions for the feeding of infants of powdered calf feed compositions, cocoa mixtures containing milk powder, have, on the surface of the individual particles, a layer of fat which is termed free fat and the quantity of which may be determined by extraction with a solvent that is immiscible with water such as tetrachloromethane. The quantity of the free fat present on the surfaces of the particles is determined, besides by the properties of the starting material employed in the production of the powder, by the conditions prevailing in the production and during the handling of the powder, since a gentle processing in the course of the production of the powder and subsequent handling results in the quantity of free fat present on the surface becoming very small, while a less gentle treatment has the result that an increased part of the fat content of the product is going to be found in the form of free surface fat.

The free fat present on the surface of the individual particles and particle agglomerates affects the reconstitution properties of the powdered milk product that means ability of, by the absorption of water, forming a liquid product in which the individual particles are evenly dispersed or emulsified in the water, and in particular, affects its ability of being rapidly dispersed in water, which is the essential precondition for the subsequent re-dissolution and emulsification.

This means that, for instance, in the preparation of whole milk from whole milk powder having a high free fat content, a relatively intensive or prolonged mechanical whipping is required in order to achieve an adequate distribution of the powder in the water.

The reason for this is that the free fat reduces the wettability of the powder and may, moreover, result in an agglutination of the particles and agglomerates which prevents the dispersion of same in the water.

In order to eliminate these drawbacks, it has been proposed to apply a coating of lecithin to the powdered product, which lecithin may possibly be dissolved in a fat. Furthermore, based on the recognition that is is especially that part of the free surface fat of the powder which is present in a solid state at ambient temperature which has an impairing effect on the reconstitution properties of the powder in cold water, it has been suggested to modify the production method for whole milk powder in such a way, that prior to the drying of the milk concentrate, a separation and fractionation of a part of the butterfat of the milk be carried out (cf. British Pat. specification No. 1,005,825). The high-melting fraction hereof is recycled to the milk concentrate before same is spray-dried, while the low-melting fraction is applied as a coating on the dried powder. Hereby it is achieved that the water-repellent effect of the solid part of the free surface is suppressed. It has also been proposed to add lecithin to the said liquid butterfat fraction prior to same being applied to the powder.

The separation and fractionation of a part of the butterfat from the milk does, however, result in a considerable complication in and increase in cost of the entire processing when producing milk powder, and an apparatus is required which is not normally available in plants producing milk products.

It has now been found that it is possible to obtain a powdered fat-containing milk product of the kind dealt with possessing particularly good reconstitution properties in cold water, by ensuring that the content of free surface fat of the product lies within quite specific limits and that, in addition, the surface of the product contains lecithin in a specific quantity which is dependent upon the quantity of that part of the fat in the surface of the product which is liquid at ambient temperature. The process according to the invention is, in conformity herewith, characteristic in that the quantity of lecithin and the quantity as well as the melting characteristic of the fat possibly applied, are proportioned in such a way that the quantity thereof, together with the free surface fat present on the milk product prior to the treatment, constitutes 1–3 percent by weight of the treated product, and in that the quantity of lecithin amounts to 15–25 percent by weight calculated on that part of the free surface fat present prior to the treatment which is liquid at ambient temperature, plus that part of the possibly applied fat which is liquid at ambient temperature, whereby the quantity applied is, in addition, fixed due regard being had to the specific surface of the milk product, so that a calculated thickness of more than 0.1 $\mu$ is obtained for the liquid fraction present on the surface, the temperature of the product being at least 35° C, preferably approximately 50° C, during the treatment, and/or the product is heated to such a temperature after the treatment.

This minimum temperature is fixed to ensure sufficient equalization of the coating on the powder agglomerates.

A preferred embodiment of the process according to the invention is characteristic in that the lecithin is applied dissolved in a melted fat having the same composition as the fat forming part of the powdered product. This results in the composition of the powder not being changed in any way which would contravene legal provisions and, moreover, in rendering superfluous the complicated fractionation of the fat in a fraction having a relatively high and a fraction having a relatively low melting point.

When, for instance, treating whole milk powder according to this preferred embodiment of the process, the lecithin will thus be applied dissolved in melted unfractionated butterfat. Dependent upon the time of the year, unfractionated butterfat contains approximately 40 percent of a fraction which is liquid at ambient temperature, while the remaining 60 percent are constituted of a fraction, the melting point of which lies about ambient temperature. The use of such unfractionated butterfat in the process according to the invention ensures the surface of the powder being coated with an adequate quantity of lecithin-containing fat which is liquid at ambient temperature in order to obtain satisfactory reconstitution properties since the hydrophobic effect of the solid fraction of the fat, contrary to what could have been expected, under the given circumstances affects the reconstitution properties of the product to only a very slight degree.

The quantities of lecithin and of a possible fat are selected within the stated intervals in dependence upon the degree of agglomeration of the powder to be treated, in that a product which is agglomerated to a particularly high degree requires relatively small additions on account of the fact that such a product has a comparatively small surface area. The best results are obtained with a calculated thickness of the surface layer of 0.1 – 0.3 $\mu$, for which reason it is expedient to measure or compute the size of the surface of the agglomerated powder with a view to determining the quantities of fat and lecithin which render the obtention of this thickness possible. In the treatment of whole milk powder intended for human consumption, in order not to impair the flavour, 0.4 percent of lecithin at the most should be used, calculated on the weight of the powder.

In the production of the product to be treated, so gentle a method will have to be used that the quantity of free fat does not exceed 3 percent by weight. In connection with whole milk powder, this means that both the drying and the agglomeration have to be effected by means of gentle methods without any violent thermal or mechanical influences being employed.

As will be understood from the above the raw material for the process according to the invention is a powdered fat-containing milk product having a particle size of more than 100 microns. The material may be manufactured by any known method e.g. by a modified spray drying process or other methods for the manufacture of agglomerated fat-containing milk powders.

The lecithin treatment according to the invention may be carried out in a plant which is in direct connection with the spray drying plant. Alternatively, the lecithin treatment may be carried out on powder which is manufactured in a separate plant and which has possibly been subject to prolonged storage and/or transportation.

The invention will now be described in more detail with reference to the drawings.

Figure 1:
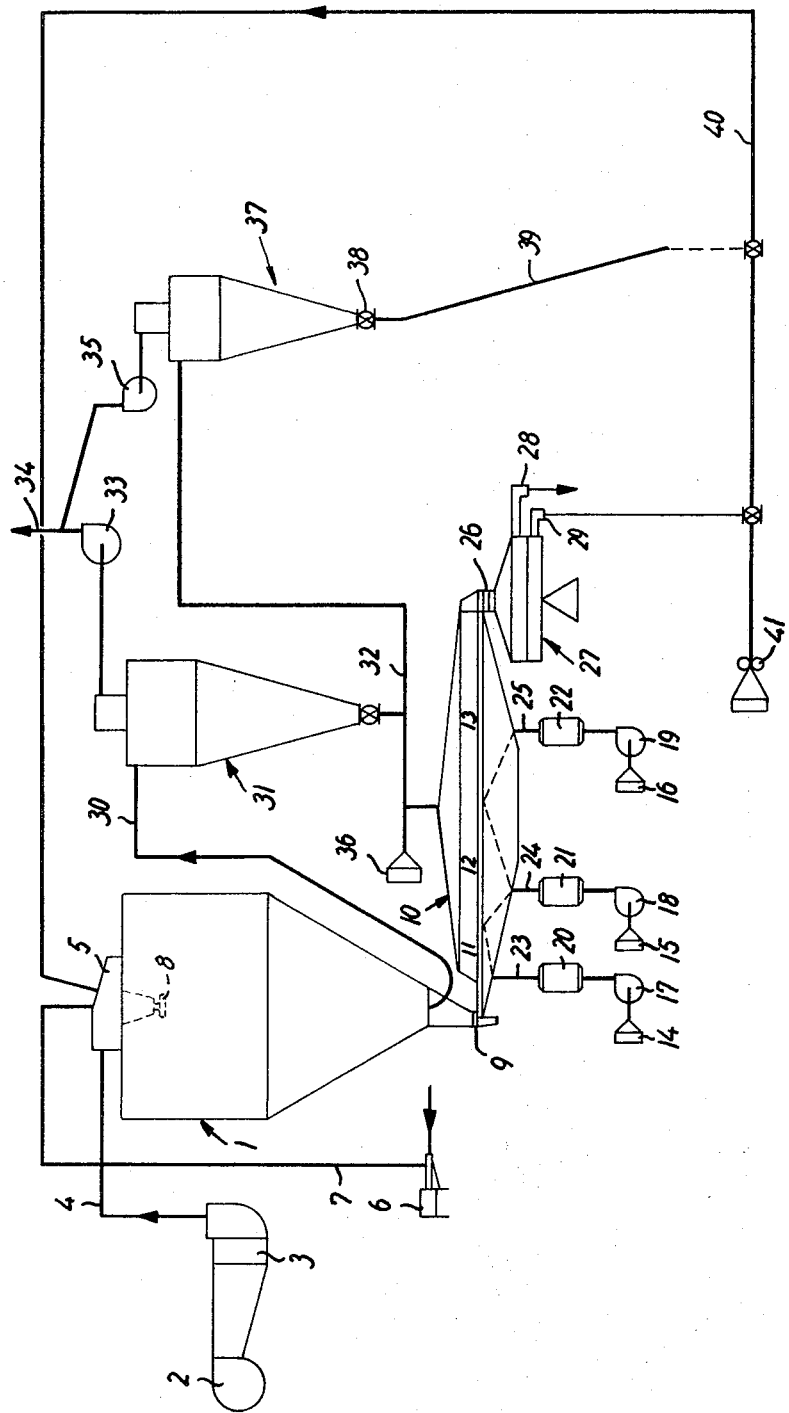
FIG. 1 shows schematically by way of example a known plant for the manufacture of whole milk powder in a quality which will be suitable for treatment according to the invention.

In FIG. 1 drying gas for a spray dryer 1 is supplied by a fan 2 from which the gas passes through a heater 3 and a line 4 to an air disperser 5 at the top of the spray dryer 1.

Whole milk is concentrated in an evaporater (not shown) and pumped by means of a pump 6 through a line 7 to a rotary atomizer 8 at the top of the spray dryer 1.

The spray dried milk powder containing some moisture leaves the bottom of the spray dryer through an outlet 9 and falls into a fluidized bed apparatus 10 which is divided into three treatment zones 11, 12 and 13 respectively. Each zone is connected with filters 14, 15 and 16 respectively, fans 17, 18 and 19 respectively, heaters 20, 21 and 22 respectively and lines 23, 24 and 25 for the supply of drying gas or air at ambient temperature.

The milk powder leaves the fluidized bed apparatus 10 through an outlet 26 and falls direct into a sieve 27 which may be of the horizontally vibrating type. In the sieve the product is classified into two fractions, the coarse fraction being the final product leaves through outlet 28 and the fine fraction being recycled as described later, leaves through outlet 29.

The drying gas from the sprayer dryer 1 contains some fine particles of the powdered product and it is led through line 30 to a cyclone 31 where the fine particles are separated and transferred through a rotary valve to a line 32.

The drying gas leaves the cyclone 31 through a fan 33 and a chimney 34. Fine particles which are blown off in the fluidized bed apparatus 10 are also transferred to the line 32. A fan 35 draws air through a filter 36 and the line 32 for pneumatic transport of the fines to a cyclone 37. The fines that are separated from the gas leave the cyclone through a rotary valve 38 and is led through line 39 to another pneumatic transport line 40.

The air from the cyclone 37 passes through the fan 35 to the chimney 34.

A fan 41 and the line 40 provides pneumatic transport of the fines from the sieve 27 and from the cyclone 37. The fines are introduced in a known manner into the zone of atomization of the spray dryer.

Figure 2:
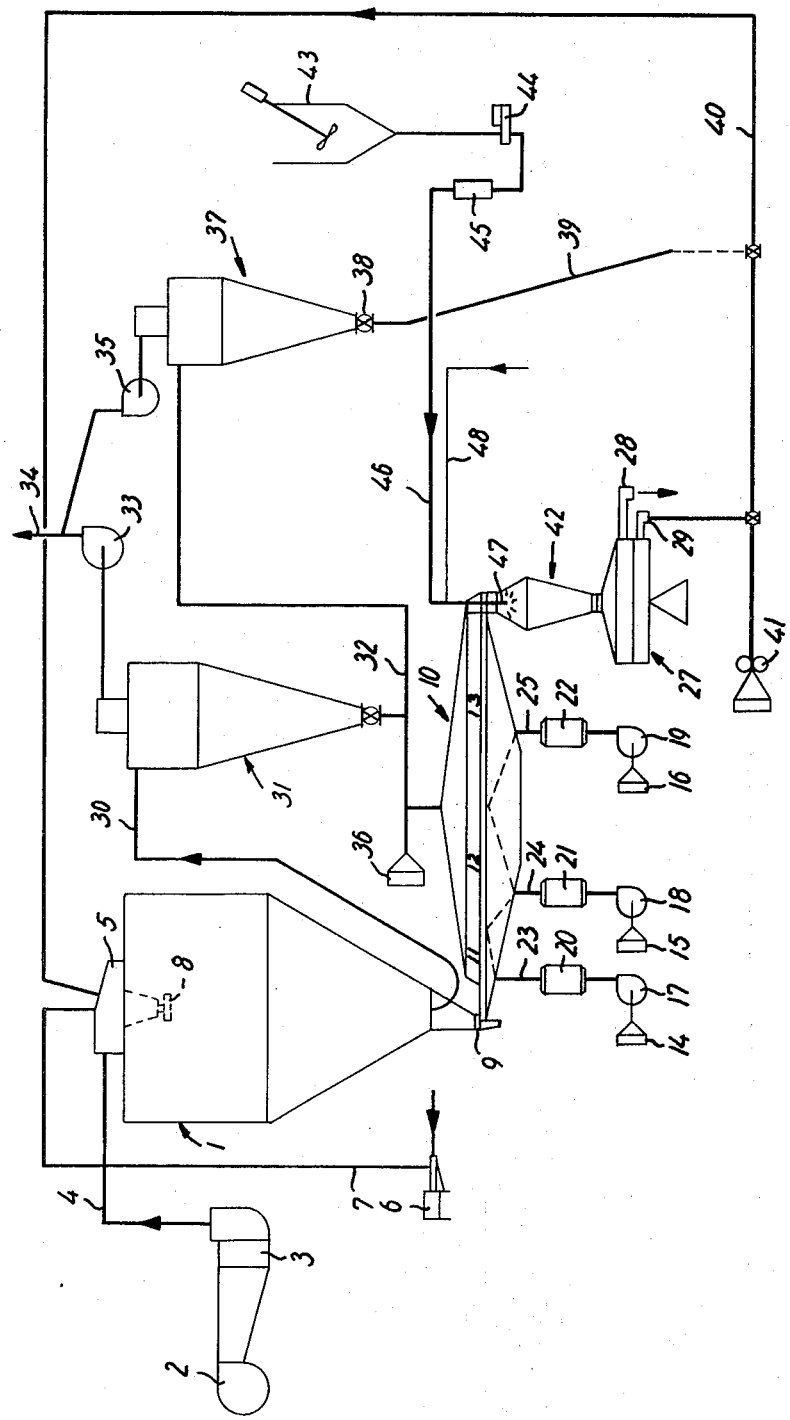
FIG. 2 shows schematically a preferred embodiment of a complete plant comprising a plant for the manufacture of spray dried whole milk powder identical with the plant shown in FIG. 1 this drying plant being in direct connection with a plant for the subsequent lecithin treatment.

The plant shown in FIG. 2 is quite similar to the oen shown in FIG. 1 but a lecithin treatment chamber 42 is inserted between the fluidizing apparatus 10 and the sieve 27.

Lecithin solution is pumped from a tank 43 by means of a pump 44 through a flow meter 45 and line 46 to a two fluid nozzle 47 placed centrally in the treatment chamber 42. The lecithin solution is atomized by means of compressed gas coming through line 48 to the nozzle 47.

The milk powder leaving the fluidized bed apparatus 10 falls dispersed in air around the nozzle and becomes coated with the lecithin solution. From the treatment chamber 42 the powder falls direct down into the sieve 27 where some equalization of the lecithin solution on the powder takes place. The product is classified in two fractions and the coarse fraction representing the final product is packed in suitable containers.

Figure 3:
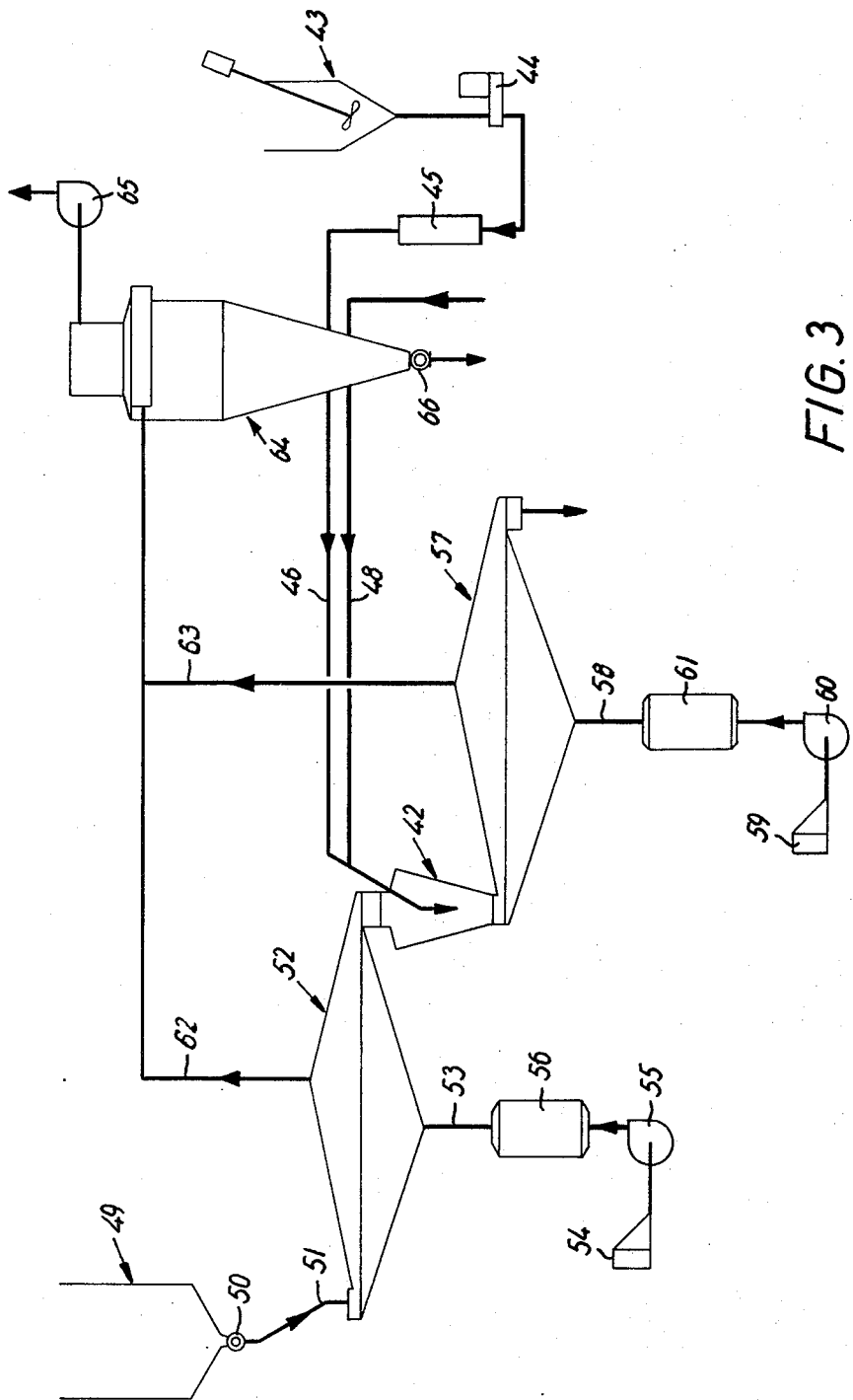
FIG. 3 shows schematically another embodiment of a plant for lecithin treatment of powder according to the invention. The powder for the process may be manufactured a considerable length of time before the treatment in the plant shown, and it may be manufactured at a distance from and transported to the treatment plant.

In the plant shown in FIG. 3 powder from a silo 49 equipped with a rotary valve 50 is fed through a line 51 to a fluidized bed apparatus 52 to which warm air is introduced through a line 53 by means of a filter 54 a fan 55 and a heater 56.

From the fluidized bed apparatus 52 the powder is treated in a chamber 42 quite similar to the one shown in FIG. 2.

After the lecithin treatment the powder falls direct into another fluidized bed apparatus 57 (where equalization of the coating takes place) to which warm air is introduced through a line 58 by means of a filter 59 a fan 60 and a heater 61.

The powder leaves the fluidized bed apparatus 57 as the final product.

Fines from the two fluid bed apparatus 52 and 57, respectively, are transferred through lines 62 and 63 to a cyclone 64 where they are separated from the air. The air is exhausted by means of a fan 65 and the fines leave the cyclone through a rotary valve 66.

The process according to the invention is illustrated in greater detail with the aid of the following examples.

EXAMPLE 1

In the course of this example, a total of five tests relating to the treatment of whole milk powder was carried out using a plant as shown in FIG. 2. This whole milk powder was produced from whole milk having a fat content of 3.3 percent by weight and a content of non-fatty solids of 9.4 percent which, prior to spray drying, had been heated to 86° C and evaporated to a total solids content of 44 percent by weight. This concentrate was spray-dried by utilizing a spray drier of the "Niro Atomizer" make and the powder obtained hereby received finishing treatment in a drier having fluid beds in three successive zones and in immediate connection with the spray drying plant. In the spray drier, an entry temperature of the drying gas of 182° C was used and a discharge temperature of the gas of 87° C. The moisture content of the powder was 5.2 percent when being removed from the spray drying plant, 4.4 percent at the end of the first drying zone and 2.8 percent when leaving the second drying zone. After having passed through the third zone the temperature of the powder was over 35° C, and the moisture content was 2.6 percent and subsequently a solution of lecithin in butterfat was sprayed on to the whole milk powder.

This spraying operation took place by the powder being allowed to drop down dispersed in air around a two-fluid nozzle where the solution was atomized by means of compressed air. The first five tests were carried out in such a way that the same amount of lecithin was dosed in all the cases, while the quantity of butterfat and its composition were varied. In tests 1-4, unfractionated butterfat was used, that is to say butterfat, of which 40 percent was liquid at ambient temperature, whereas in test No. 5, a butterfat fraction was used instead which was liquid at ambient temperature.

The details of the tests and the results obtained appear from the table provided below. It appears from this table that by carrying out the treatment by using the process according to the invention as was done in test No. 4, reconstitution properties are obtained which are, substantially, just as good as those obtained when treating the powder according to the known, but by far more complicated process which is used in test No. 5, in which, preceding the treatment, a fractionation of the butterfat supplied is carried out.

It is remarked that the calculations in the table are carried out based on the assumption that also the free surface fat present on the untreated powder, by about 40 percent, consists of a fraction which is liquid at ambient temperature.

The whole milk powder which was treated in this example had a relatively low free surface fat content and a relatively large area per unit of weight, for which reason it was necessary to supply a comparatively large amount of butterfat for meeting the demands made by the process according to the invention.

The reason why satisfactory reconstitution properties were not obtained in test No. 3 was due to the fact that the liquid fraction in the surface layer was only just sufficient for forming a surface layer having a computed thickness of 0.1 $\mu$, which was not wholly adequate for effectively enhancing the wettability of the powder.

EXAMPLE 2

In this example, whole milk powder was treated, which was produced from whole milk having a fat content of 3.25 percent by weight and a non-fatty solids content of 8.90 percent by weight, which whole milk, prior to the spray drying, was heated to 115° C and evaporated to 50.8 percent by weight of total solids. This concentrate was spray-dried and subjected to a finishing drying process in the same apparatus as the one employed in Example 1, wherein for the spray drying plant an entry temperature of the drying gas of 187° C and a discharge temperature of 79° C were used. The moisture contents obtained were as follows. When leaving the spray drying apparatus, it was 5.7 percent, when leaving the first fluid bed zone it was 4.5 percent and when leaving the second fluid bed zone it was 2.3 percent and after the third fluid bed zone 2.2 percent. The temperature of the powder leaving the third zone was higher than 35° C.

The powder was treated by utilizing the process according to the invention in a similar manner as described in Example 1. The characteristics of the powder and of the treatment used are detailed in the table below.

It is seen from the table that the higher content of free surface fat in the untreated powder, which surface

TABLE

| | Example 1.—Test number— | | | | | Example 2 |
|---|---|---|---|---|---|---|
| | 1 | 2 | 3 | 4 | 5 | |
| 1 Free surface fat in untreated powder, percent by weight | 0.8 | 0.8 | 0.8 | 0.8 | 0.8 | 2.1 |
| 2 Lecithin added, percent by weight on powder | 0.2 | 0.2 | 0.2 | 0.2 | 0.2 | 0.2 |
| 3 Butterfat added, percent by weight on powder | 0.2 | 0.5 | 1.0 | 2.0 | ¹ 0.8 | 0.2 |
| 4 Liquid fraction of added butterfat, percent by weight on powder | 0.08 | 0.2 | 0.4 | 0.8 | 0.8 | 0.08 |
| 5 Entire surface layer, percent by weight on powder ² | 1.2 | 1.5 | 2.0 | 3.0 | 1.8 | 2.5 |
| 6 Liquid fraction of surface layer, percent by weight on powder ³ | 0.6 | 0.72 | 0.92 | 1.32 | 1.32 | 1.12 |
| 7 Lecithin, percent by weight on entire surface layer | 16.7 | 13.3 | 10.0 | 6.7 | 11.1 | 8.0 |
| 8 Lecithin, percent by weight on liquid fraction of surface layer | 33.3 | 27.8 | 21.7 | 15.1 | 15.1 | 17.8 |
| 9 Surface area of powder m.²/100 g.⁴ | 9.8 | 9.8 | 9.8 | 9.8 | 9.8 | 5.7 |
| 10 Liquid fraction in surface layer per area unit surface, g./m.² | 0.061 | 0.073 | 0.094 | 0.135 | 0.135 | 0.197 |
| 11 Thickness of liquid surface fraction $\mu$ ⁵ | 0.065 | 0.078 | 0.100 | 0.144 | 0.144 | 0.209 |
| 12 Wettability, sec./13 g. powder ⁶ | >5 min. | >5 min. | >5 min. | 20 sec. | 17 sec. | 6 sec. |

¹ The butterfat used in test 5 was only the fraction liquid at ambient temperature.

² Calculated as 1+2+3.

³ Calculated as $1 \times \frac{40}{100} + 2 + 4$.

⁴ Determined by measuring the permeability to air.

⁵ Calculated on the basis of a density of 0.948 g./cm.³.

⁶ Determined by careful, standardized pouring of 13 g. powder on to the quiescent surface of 100 ml. water and by measuring the time which elapses before the powder has sunk below the surface of the water.

fat has hitherto been regarded as being deleterious to the reconstitution properties of the powder, by means of the treatment used in the process according to the invention and by employing a relatively small amount of added butter-fat, renders possible the obtention of a surface layer having a suitable thickness of the liquid surface fraction and a suitable concentration of lecithin so that the reconstitution properties of the powder become particularly satisfactory.

EXAMPLE 3

In this example whole milk powder was produced in a plant as shown in FIG. 1 using the same operating conditions as described for the drying in example 2 except that the heater 22 was not used, the moisture content of the powder when leaving the fluidized bed apparatus 10 consequently was 2.7 percent instead of 2.2 percent.

This powder was then filled into 500 kg containers which were shipped to a another factory in another country at a considerable geographic distance from the first factory.

17 days after the manufacture, the milk powder was treated according to the invention in an apparatus as shown in FIG. 3. The temperature of the gas entering the fluidized bed apparatus 52 and 57 were 59° C and 43° C respectively. Which means that the temperature conditions of the present process were fulfilled. In the treatment chamber 42 the powder was treated utilizing the process according to the invention in a similar manner as described in example 1.

The powder collected in the cyclone was packed in paper bags. The quality of this powder corresponded to ordinary non-agglomerated whole milk powder and the quantity was 5.5 percent of the total production.

The final product leaving the fluidized bed apparatus 57 was collected in 200 kg containers and packed in one-half lb tins using known nitrogen packing technique.

No significant difference between the properties of the powder and the powder of example 2 could be observed. The wettability of the powder was measured at 5 sec. and the dispersibility was visually evaluated to be somewhat better than the powder of example 2.

Even though the process according to the invention is described here in connection with the treatment of milk products, it will be obvious to the person skilled in the art that it may be employed for the treatment of other fat-containing powdered products to which it is desired to impart such a wettability in cold water that it will be easier to mix them in same. As examples of such products, compositions containing cocoa and milk powder may be quoted.

What we claim is:

1. A process for treating a powdered fat-containing milk product in order to enhance its reconstitution properties in cold water, comprising applying a coating of lecithin dissolved in a fat to powder agglomerates of said milk product having a particle size of more than 100 microns, whereby the quantity of lecithin and the quantity of fat which are to be applied satisfy the following inequalities:

$$1 \leq a + b + c + d + e \leq 3,$$
$$15 \leq 100 \, e/(a+c) \leq 25, \text{ and}$$

the numerical value of the sum of $a + c + e >$ than the numerical value of $10^{-5}$ times $f$ wherein $a$ is the percent by weight of free surface fat which is present prior to the treatment and which is liquid at ambient temperature, $b$ is the percent by weight of free surface fat which is present prior to the treatment and which is solid at ambient temperature, $c$ is the percent by weight of fat to be applied which is liquid at ambient temperature, $d$ is the percent of weight of fat to be applied which is solid at ambient temperature, $e$ is the percent by weight of lecithin to be applied, and $f$ is the specific surface area in cm$^2$/100 g powder, the temperature of the product being at least 35° C during the treatment or the product being heated to a temperature of at least 35° C after the treatment, said percents by weight being based on the weight of the powder prior to said treatment.

2. A process as claimed in claim 1, wherein the lecithin is applied dissolved in a melted fat having the same composition as the fat forming part of the powdered product.

3. A process as claimed in claim 1, wherein the temperature is approximately 50° C.

4. The product produced by the process of claim 1.

* * * * *